May 22, 1956
M. M. SMITH ET AL
2,746,574
HYDRAULIC TRAILER HITCH
Filed March 11, 1953
2 Sheets-Sheet 1
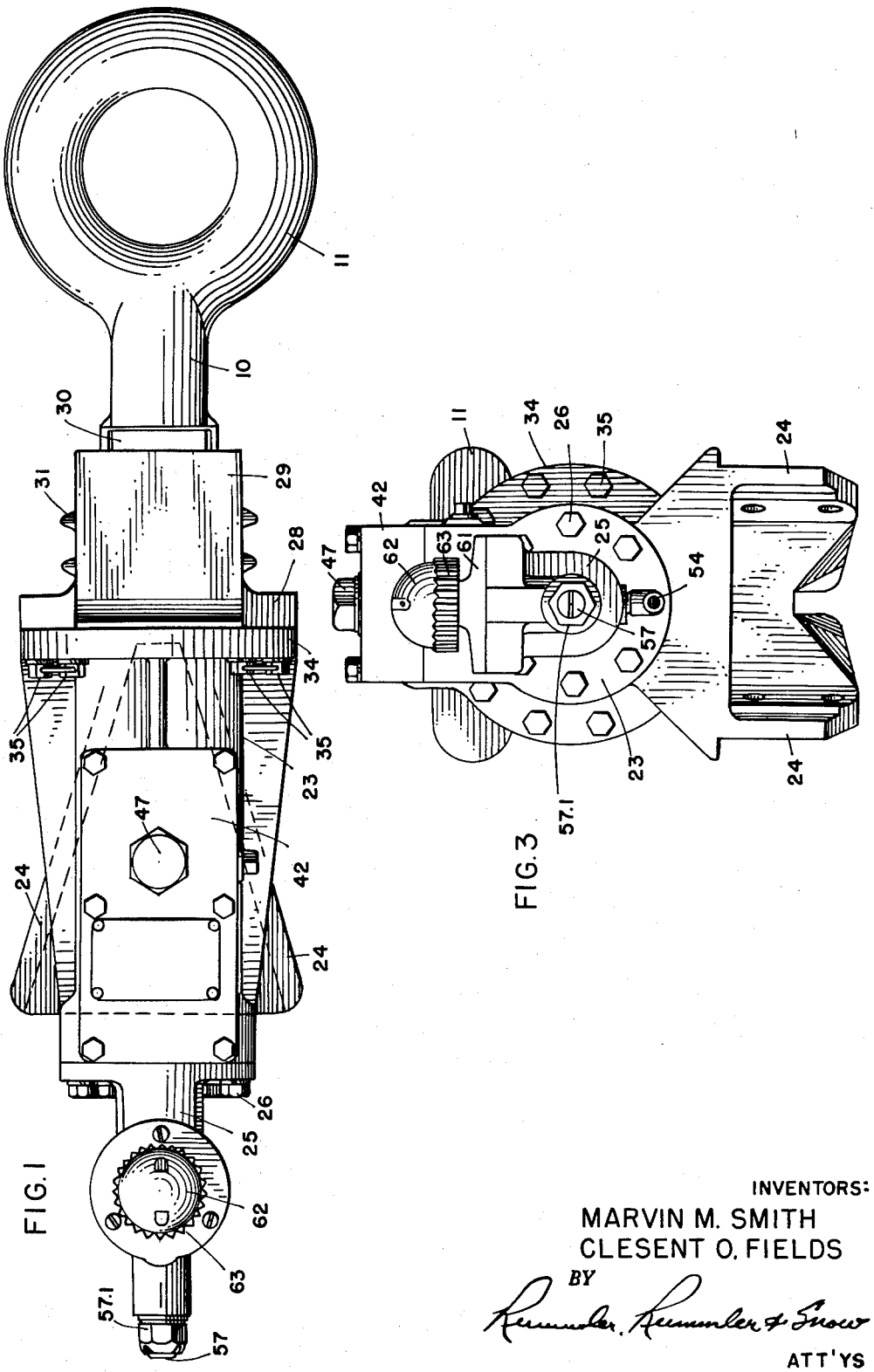
INVENTORS:
MARVIN M. SMITH
CLESENT O. FIELDS
BY
ATT'YS

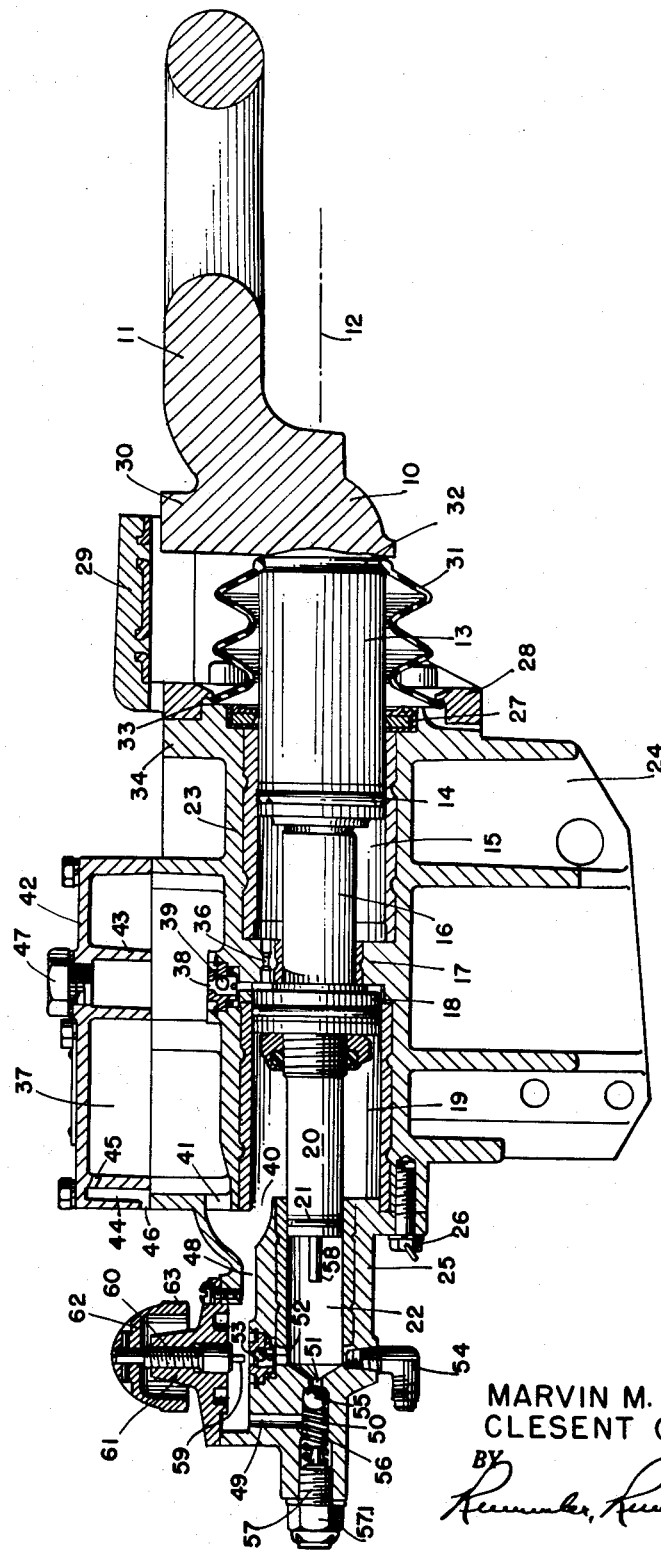

United States Patent Office 2,746,574
Patented May 22, 1956

2,746,574

HYDRAULIC TRAILER HITCH

Marvin M. Smith and Clesent O. Fields, Muncie, Ind., assignors to Muncie Gear Works, Inc., Muncie, Ind., a corporation of Indiana Application March 11, 1953, Serial No. 341,664

8 Claims. (Cl. 188—112)

This invention relates to trailer hitches, and particularly to those which have incorporated therein shock-absorbing and automatic brake actuating mechanisms, such as that disclosed in the copending application of H. P. Henry, Serial No. 268,869, filed January 29, 1952, for Hydraulic Towing Link, now Patent 2,698,069.

The main objects of this invention are to provide an improved construction for combined trailer hitch and brake mechanisms having improved arrangement of parts whereby the structure will be inexpensive to manufacture and comprise a minimum of parts; to provide an improved structure of this kind in which the drawbar of the hitch and the operating pistons of the shock-absorbing and brake actuating mechanisms constitute a unitary structure that can be produced mainly by automatic machine operations; to provide improved construction of the hydraulic shock-absorbing and master brake units; to provide an improved construction and mounting for the drawbar whereby adjustment of the height of the coupling end thereof is accomplished by mere rotation of the drawbar on its axis; and to provide an improved automatic brake-actuating trailer hitch of simple, unitary, and rugged construction capable of withstanding the most severe operational uses to which such devices may be put.

A specific embodiment of this invention is show in the accompanying drawings, in which:

Figure 1 is a top plan view.

Fig. 2 is a vertical sectional view of the device taken on the longitudinal axis of Fig. 1, and Fig. 3 is an end elevation of the same as viewed from the left of Figs. 1 and 2.

In the form shown in the drawings, the trailer hitch comprises a drawbar 10 in the form of a piston rod which, for the most part, is of circular cross-section with respect to its principal axis, and which has a coupling member 11 at one end in the form of an eye or lunette that lies in a plane parallel with the axis 12. The lunette 11 is offset to one side of the axis 12 so that it may be adjusted upward or downward by merely rotating the drawbar about the axis. The eye 11 is shown in its elevated position in Fig. 2.

The piston rod portion of the drawbar 10 comprises a cylindrical portion 13 which, with a packing 14, serves as a piston reciprocable within a cylinder 15; a second cylindrical section 16, aligned with the section 13, which is of reduced size to serve as a piston connecting rod passing through the transverse cylinder end wall 17 and is connected to a second piston 18, which is reciprocable within a cylinder 19; and a final piston rod section 20 which, with packing 21, serves as a piston for the master cylinder 22 of a fluid brake system of the trailing vehicle.

The cylinders 15 and 19 of the dashpot or shock-absorbing mechanism consist of aligned bores, separated by the relatively heavy transverse wall 17, in a single casting that forms part of the main supporting frame 23, which has depending flanges 24 whereby thus the device is attached to the usual hitch brackets of the trailer. The pulling load on the drawbar 10 is thus transmitted to the supporting frame 23 by means of the piston 18 which engages the partition wall 17. The cylinder 22 is formed in a head casting 25 that is rigidly attached to the frame casting 23 by bolts 26, thereby providing a unitary cylinder structure in which the main operating parts are wholly contained within a single housing having a single operating axis.

The forward or outer end of the cylinder 15 is provided with a packing 27, coacting with the piston portion 13, and has bolted thereon a fitting 28, which is of ring form, and has an integral guide arm 29, that partly embraces a lug 30 on the drawbar 10, to prevent rotation of the drawbar with respect to the guide member 29, but to permit of the desirable amount of longitudinal reciprocatory movement of the drawbar. A bellows type of flexible dust cap 31 protects the reciprocating piston rod section 13, and is secured at one end in a groove 32 in the drawbar, and at the other end in a groove 33 formed between the fitting 28, the head flange 34 of the cylinder 15. Bolts 35 secure the fitting 28 to the head flange 34, and are arranged symmetrically about the axis 12, so that the fitting 28 may be turned 180° about the axis 12 to bring the lunette or eye 11 below the axis 12, thus providing for vertical adjustment of said coupling eye to accommodate various pintle heights on the tractor or pulling vehicle.

For the purpose of checking shock, both forward and backward, between the towing vehicle and the trailer, the partition, or transverse cylinder end wall 17, serves as a common head between the first cylinder bore 15 and the second cylinder bore 19 and cooperates with the pistons 13 and 18, respectively, in both the shock-absorbing functions of these cylinders and as the load transmission member for any movement of the connecting rod and piston assembly in either direction. The partition 17 also has a restricted passage 36 connecting the cylinders 15 and 19, which passage is formed to a predetermined size to determine the rate of flow of liquid from one cylinder to the other, and thereby through hydraulic resistance established the shock-absorbing cushion to the pull of the towing vehicle or overriding movement of the trailer as will be readily understood.

Since the cylinders 15 and 19 are of equal diameter and the pistons 13 and 18 move in unison, the spaces between the wall 17 and the pistons 13 and 18 will always be full of the hydraulic fluid regardless of the position of the pistons relative to the wall 17.

A reservoir 37 is incorporated into the upper part of the main casting 34 and serves to supply operating fluid both to the shock-absorbing cylinders and to the master brake cylinder 22. This reservoir has a passage 38 controlled by a ball check-valve 39, which allows fluid to pass from the reservoir 37 to the cylinder 19 adjacent to the wall 17, but prevents a reverse flow. This connection serves to replenish any liquid that may be lost by leakage. The space between the piston rod section 20 and the cylinder 19 communicates with the reservoir 37 through passages 40 and 41 and is thus kept full of fluid, but these passages are large enough to offer no interference with the movement of the piston 18. Thus the shock-absorbing function is entirely controlled by the size of the passage 36 in the wall 17, which serves as a common head for the aligned cylinders 15 and 19. The cover member 42, of the reservoir 37, is provided with a filler inlet pipe 43, which extends downward within the reservoir to facilitate filling the reservoir with brake fluid, and help in establishing a liquid level with an air space above it. This air space is open to the atmosphere through a tortuous passage 44 of which the inner end 45 is near the top of the reservoir 37, and the outer end 46 somewhat lower. The inlet pipe 43 is closed by plug 47.

The head fitting 25 which contains the master brake cylinder 22 has a by-pass passage 48 that communicates with the reservoir 37 through passage 41, and with the cylinder 22 through passages 49, 50 and 51. The cylinder 22 is also connected to the by-pass passage 48 by a passage 52 controlled by ball-check valve 53, which allows the brake fluid to flow freely from the by-pass passage 48 to the cylinder 22, when the piston 21 is moving to the right of Fig. 2, but prevents reverse flow when the movement of the piston 21 is reversed. The interior of the cylinder 22 is connected by suitable piping, or conduit means, represented by the elbow 54, with the several brake actuating cylinders of the trailer wheels which are thus always sensitive to whatever pressure may exist in the cylinder 20.

The passage 51 is controlled by a ball-check valve 55 which is normally held closed by a spring 56 housed within the passage 50. The spring 56 is of predetermined strength, adjustably compressed by the screw plug 57, so as to hold the valve 55 closed against pressure in the chamber of cylinder 22 greater than a predetermined pressure sufficient to set the brakes of the trailer. Pressure in the brake cylinder 22 greater than the predetermined pressure to set the trailer brakes, for example 1400 p. s. i., will force the ball-check against the closing pressure of the spring 56 and open the passage 51, to bleed off fluid from the cylinder 22, thereby avoiding excessive pressure on the trailer brake liner and at the same time permitting rearward movement of the piston 21 to the full end of its maximum rearward stroke distance. This last function can only occur, however, when there is sustained rearward pressure on the drawbar 10, as by deliberate backing of the vehicles, and does not occur under forward movement conditions because of the retarding action of the set trailer brakes which normally results in a relative forward movement of the tow bar 10. The adjustment of the screw plug 57 is held by a lock nut 57.1.

The piston rod has a prong 58 extending beyond the piston 21, of the master brake cylinder 22, in line with the passage 51. This prong is of sufficient length and diameter to enter the passage 51, and unseat the ball-valve 55, when the piston 21 reaches the end of its rearward stroke in the cylinder 22 as determined by engagement of the piston 13 against the cylinder end wall 17. Normally, and as usual in devices of this nature, the pressure relations are such that when the trailer tends to override the towing vehicle, the piston 21 will increase the fluid pressure in the master brake cylinder 22 and the brake lines 54, according to the force applied axially on the towing bar 10, so as to apply or set the brakes before the possibility of this overriding movement of the trailer can cause the so-called "jackknife" buckling of the coupling between the trailer and the towing vehicle. However, when the increase of pressure within the cylinder 22 is caused by deliberate backing of the towing vehicle, the brakes of the trailer will first be set by the initial increase of pressure in the master brake cylinder 22 but will be completely released when the pressure fluid has been bled from the cylinder 22 through the check valve 55 and the prong 58 has moved a sufficient distance to mechanically unseat the valve 55, thereby permitting free communication with the reservoir 37 and complete release of fluid pressure from the brake systems.

In order to cut out entirely any braking effect on the trailer due to movements of the towing vehicle, as might be desirable for certain maneuvering operations, the ball check 53, through which fluid is returned to the cylinder 22, may be held in an open position by the pin 59, which has a threaded shank 60 mounted in the cover member 61 of the by-pass passage 48. The pin 59 has an operating head 62 with a knurled rim 63, whereby the pin 59 may be screwed down to a position for mechanically unseating the valve 53 or retracted to an elevated position as shown in Fig. 2.

It is to be noted that in the structure shown in the drawings, there are few, if any, places where machining operations are required other than those that can be performed by standard lathe or automatic machine operations. It will be understood, however, that each of the cylinders 15, 19 and 22, as well as the guide arm 29, are provided with suitable liners in which the respective pistons slide and that these liners, preformed, may be cast directly into the main housing casting 23 at the time it is formed. Thus, the machining operations are few and relatively simple and the improved hitch construction, as a whole, is capable of being mass-produced without any sacrifice whatsoever of precision fit and operation of its several component parts.

Although but one specific embodiment of this invention is herein shown and described, it will be understood that details of the construction shown may be altered or omitted without departing from the spirit of the invention as defined by the following claims.

We claim:

1. A combined coupling and brake-operating mechanism for a vehicle train comprising a housing having a pair of axially aligned bores separated by a rigid transverse wall forming a part of said housing, a brake-operating cylinder rigidly mounted on said housing at the end of one of said bores opposite said transverse wall and opening thereinto in axial alignment therewith, a piston in each of said bores and in said brake cylinder respectively, a common piston rod extending axially through said bores and transverse wall into the brake cylinder and connecting said pistons axially for reciprocable operation thereof in unison, said connection rod extending outwardly from said housing and the other bore thereof, means for yieldably resisting movement of the pistons in the bores of said housing in either axial direction, the last named pistons being directly engageable with said transverse wall for limiting the stroke of said connecting rod in either axial direction, and vehicle coupling means on the outer end of said connecting rod.

2. A combined coupling and brake-operating mechanism for a vehicle train comprising a housing having oppositely entering axially aligned first and second bores separated by a rigid transverse wall formed integrally with said housing, a hydraulic brake-operating cylinder rigidly mounted on said housing at the end of the second bore opposite said transverse wall and opening thereinto in axial alignment therewith, said brake cylinder having an internal diameter less than that of the said second bore, a tow bar extending axially into said housing through the bores thereof and said transverse wall and terminating as a piston in said brake cylinder, said transverse wall having a central passage for said tow bar and said tow bar having a sliding fluid-pressure-tight fit in said passage, a piston in each bore of said housing and having rigid connection with said tow bar for movement in unison therewith, and hydraulic means in said housing for yieldably resisting movement of the piston in said bores in either axial direction, said last named piston being axially engageable with said transverse wall for limiting the axial stroke of said tow bar in either direction.

3. A combined coupling and brake operating mechanism for a vehicle train comprising a housing having oppositely entering axially aligned first and second bores of equal diameter separated by a rigid transverse wall formed integrally with said housing, a hydraulic brake-operating cylinder rigidly mounted on said housing at the end of the second bore opposite said transverse wall and opening thereinto in axial alignment therewith, said brake cylinder having an internal diameter less than that of the said second bore, a tow bar extending axially into said housing through the bores thereof and said transverse wall and terminating in said brake cylinder, said transverse wall having a central passage for said tow bar and said tow bar having a sliding fluid-pressure-tight fit in said passage; said tow bar having an integral piston portion in the first bore slidably fitting therewith, a connecting rod portion of reduced diameter extending from said piston portion through said transverse wall and into the second bore, a piston in said second bore fixedly mounted on the connecting rod portion therein, and an integral cylindrical terminal portion on said tow bar extending into the brake cylinder with sliding fit therewith to provide a piston therefor; and hydraulic means in said housing between the pistons therein and said transverse wall for yieldably resisting movement of the pistons in the first and second bores in the direction towards said transverse wall, said pistons being respectively engageable with said transverse wall for limiting the stroke of said tow bar in either axial direction.

4. A trailer hitch and brake mechanism comprising a shock absorbing cylinder and a fluid brake-operating cylinder connected in end to end axial alignment, a rotatable piston rod extending axially through said shock absorbing cylinder and into said brake-operating cylinder, said rod having pistons rigidly mounted thereon in each of said cylinders, and a hitch coupling member on the outer end of said piston rod laterally offset from the axis thereof whereby the elevation of said coupling member in relation to the rod axis can be changed by rotating said piston rod through one-half turn about its axis.

5. In a trailer hitch and brake mechanism, the combination of a draw bar comprising a cylindrical piston rod having a coupling eye at one end lying in a plane parallel with and offset laterally from the axis of said piston rod, axially spaced and aligned annular pistons on said piston rod, a fluid shock-absorbing cylinder surrounding and operatively coacting with one of said pistons for cushioning axial movement of said rod, and a master fluid brake cylinder co-axially surrounding and operatively coacting with another of said pistons for applying pressure to a hydraulic brake system, said draw bar being rotatable about its axis in said cylinder.

6. In a trailer hitch and brake mechanism, the combination of a draw bar comprising a cylindrical piston rod having a coupling eye at one end lying in a plane parallel with and offset laterally from the axis of said piston rod, axially spaced and aligned annular pistons on said piston rod, a fluid shock-absorbing cylinder surrounding and operatively coacting with one of said pistons for cushioning axial movement of said rod, a master fluid brake cylinder surrounding and coacting axially with another of said pistons for applying pressure to a hydraulic brake system, said draw bar being rotatable about its axis in said cylinders, and a fluid supply reservoir common to both said cylinders.

7. In a trailer hitch and brake mechanism, the combination of a draw bar comprising a cylindrical piston rod having a coupling eye at one end lying in a plane parallel with and offset laterally from the axis of said piston rod, axially spaced and aligned annular pistons on said piston rod, a fluid shock-absorbing cylinder surrounding and operatively coacting with one of said pistons for cushioning axial movement of said rod, a master fluid brake cylinder operatively coacting with another of said pistons for applying pressure to a hydraulic brake system, said draw bar being rotatable about its axis in said cylinders, said cylinders and draw bar being relatively movable axially, and removable means normally holding said draw bar against rotation.

8. A combined coupling and brake-operating mechanism for a vehicle train comprising a fluid pressure shock-absorbing cylinder and a fluid pressure brake-operating cylinder axially aligned and rigidly connected together, partition means integral in said shock-absorbing cylinder and dividing the same into oppositely extending portions, said brake cylinder opening axially into the adjacent shock-absorbing cylinder portion, a piston in each of said cylinder portions and in said brake cylinder, a common reciprocable connecting rod extending axially through the shock-absorbing cylinder portions and said partition means and into the brake-operating cylinder for rigidly connecting said pistons in axially spaced relation, said connecting rod extending outwardly from the end of the shock-absorbing cylinder opposite said brake cylinder, and vehicle coupling means on the outer end of the said connecting rod, said shock-absorbing cylinder pistons being respectively engageable with said partition means for limiting the stroke of said connecting rod in either axial direction.

References Cited in the file of this patent

UNITED STATES PATENTS

| | | |
|---|---|---|
| 1,273,059 | Hild | July 16, 1918 |
| 1,318,298 | Paris | Oct. 7, 1919 |
| 2,162,029 | Paul | June 13, 1939 |
| 2,401,084 | Laudahl | May 28, 1946 |
| 2,407,156 | Horne | Sept. 3, 1946 |
| 2,483,074 | Swain | Sept. 27, 1949 |

FOREIGN PATENTS

| | | |
|---|---|---|
| 411,629 | Italy | Apr. 7, 1945 |